Jan. 19, 1971 LE ROY L. FELLOWS 3,556,929
TREMOLITE FACED LAMINATED PANELS
Filed Aug. 1, 1967

LeRoy L. Fellows
INVENTOR.

BY Clarence A. O'Brien
and Harvey B. Jacobson
Attorneys 3,556,929
TREMOLITE FACED LAMINATED PANELS
Le Roy L. Fellows, 1540 Johnson St.,
North Bend, Oreg. 97459
Filed Aug. 1, 1967, Ser. No. 657,697
Int. Cl. B32b 13/04; C09j 5/06
U.S. Cl. 161—205                                6 Claims

ABSTRACT OF THE DISCLOSURE

A composite structural panel comprising a core wherein at least one side of the core is provided with an outer layer of a tremolite-thermosetting synthetic resin composition pressure laminated thereto at a temperature suitable to cure the resin while simultaneously compressing the laminated panel to a final dimension.

The present invention relates to novel composite structural panels and more particularly to composite structural panels provided with at least one outer lamina comprising tremolite and a thermosetting synthetic resin binder. More specifically, the present invention relates to the provision of tremolite surfaced panel cores to greatly enhance the appearance and utility of generally fibrous unfinished core panels.

It is an object of the present invention to provide novel tremolite-thermosetting synthetic resin pressure laminated composite structural panels characterized by a relatively hard glossy surface finish.

Another object of the present invention is to provide novel composite structural panels comprising at least one outer lamina of thermosetting synthetic resin bound tremolite pressure laminated to a suitable core at a temperature and pressure sufficient to cure the thermosetting resin and simultaneously press the tremolite-resin lamina on the core panel to a desired final dimension.

A further object of the present invention is to provide novel composite structural panels having at least one side provided with a lamina of a tremolite-thermosetting synthetic resin composition comprising approximately 9 parts tremolite to approximately 1 part synthetic resin and pressure laminated to a core panel between heated plates wherein the tremolite-resin admixture is subjected to sufficient pressure to reduce it to approximately one half its original thickness so as to provide a dense relatively inert, insulating, hard, glossy, and chip-resistant lamina.

Still another object of the present invention is to provide a process of providing tremolite-synthetic resin pressure laminated structural panels wherein the utilization of short staple fibrous tremolite with a resin selected from the group consisting of phenol-formaldehyde, resorcinol-formaldehyde, melamine-formaldehyde and admixtures thereof is critical to carrying forth the present invention for the production of suitable composite structural panels.

Figure 1:
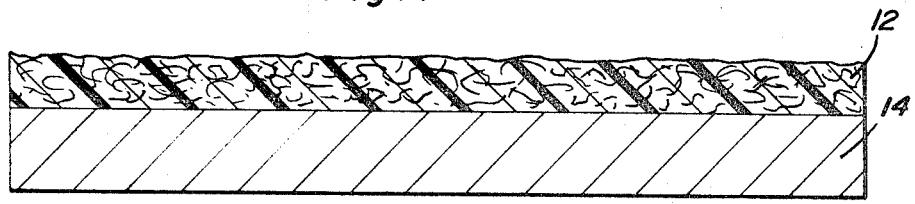
Figure 2:
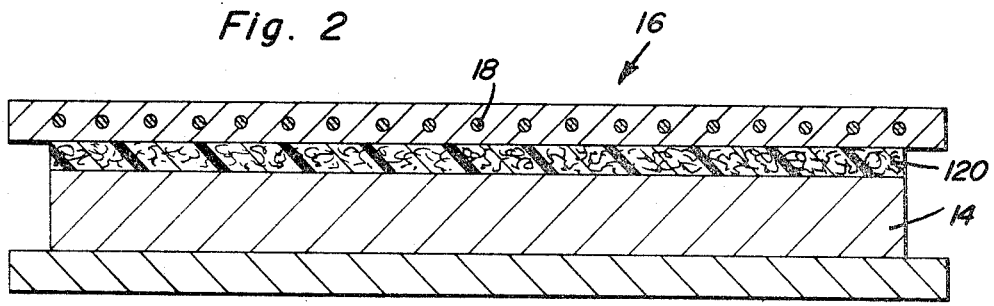
Figure 3:
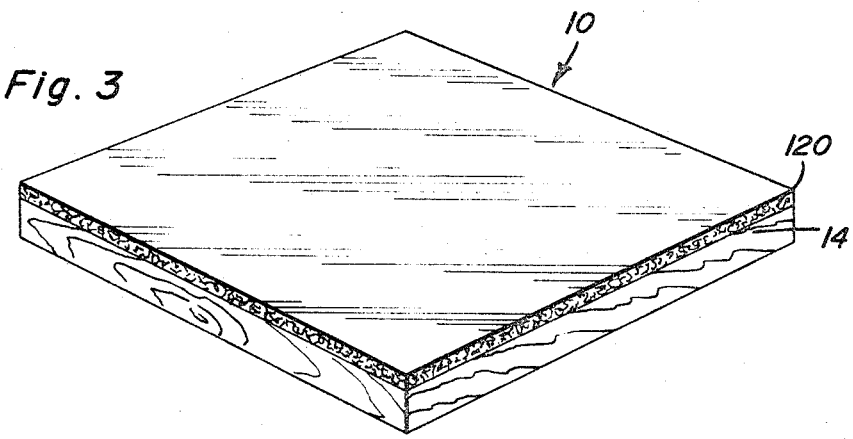

These together with other objects and advantages which will become subsequently apparent reside in the details of structural panels produced in accordance with the present invention as more fully hereinafter described and claimed, reference being had to the accompanying drawings forming a part hereof, wherein like numerals refer to like parts throughout, and in which:

FIG. 1 is a cross-sectional view of a panel core member coated with an uncured, relatively noncompressed, tremolite-thermosetting synthetic resin composition;

FIG. 2 illustrates an exemplary manner in which the structural panel of FIG. 1 may be subjected to sufficient heat and pressure to simultaneously compress and cure the tremolite-thermosetting synthetic resin coating on the panel core; and FIG. 3 is a perspective view of an exemplary composite, tremolite-thermosetting synthetic resin faced, structural panel produced in accordance with the present invention.

Briefly, as may be appreciated from a consideration of the drawings, the process of the present invention for the production of an improved structural panel, as indicated generally at 10, comprises pressure bonding a tremolite-thermosetting synthetic resin composition to cardboard, particle board, plywood, heavy core cardboard and other unfinished fiber panel cores. More particularly, the process generally comprises admixing refined fibrous tremolite with a minor proportion of a thermosetting synthetic resin selected from a group consisting of phenol-formaldehyde, resorcinol-formaldehyde and melamine-formaldehyde basic catalyst promoted resins and admixtures thereof. The tremolite uncured resin mixture 12, preferably having a consistency of a thick, workable paste is then coated upon the surface of the unfinished fibrous panel 14 being used as te core. The thickness of the uncured coating applied to the core member is normally approximately twice that of the desired final cured thickness of the tremolite-resin lamina inasmuch as during molding of the tremolite-resin composition in a suitable heated press, as indicated at 16, it is simultaneously cured and compressed to approximately one half its original thickness, as seen at 120, at temperatures in the order of 260° F. to 350° F. at compression molding pressures in the order of 1000 p.s.i. to 7000 p.s.i., for example in order to impart a suitable density to the tremolite resin lamina. The press 16 may, for example, be heated by electrical resistance heating elements 18. With regard to the pressures set forth, it will be understood of course, that the maximum pressure applied should not exceed the level where cell decomposition will take place in the particular core panel being used. In addition, the length of time the tremolite-resin coated core panel must remain in the compression molding press within the temperature and pressure ranges set forth depends primarily upon the parameters necessary to effect curing of the thermosetting synthetic resin used. The pressure laminated, i.e. compression molded, composite structural panel is then allowed to cool in the press to a relatively low temperature so as to reduce the possibility of the panel distorting during cooling.

The following examples are included to more specifically illustrate the process of the present invention for the production of composite tremolite-thermosetting synthetic resin faced structural panels.

EXAMPLE I

Approximately 9 parts, by weight, of refined short staple fibrous tremolite is admixed with approximately 1 part, by weight, of uncured phenol-formaldehyde thermosetting synthetic resin and a minor proportion of a basic catalyst, such as sodium carbonate, to provide a viscous, but spreadable, tremolite uncured resin admixture. A minor proportion of colorant, if desired, may be added to the tremolite-resin admixture. The uncured tremolite-resin admixture is then spread upon the surface of a plywood core, for example, to a thickness of approximately one-half inch. The so coated plywood core, is then placed between the plates of a suitable heated press heated to a temperature of approximately 260° F. to 350° F. under moderate pressure. When the tremolite-resin coating approached the desired curing temperature, and before it had become rigid enough to resist further compression the pressure of the plates was increased to approximately 2000 to 6000 p.s.i. whereby the tremolite-resin layer is simultaneously compressed to approximately one half its original thickness, i.e. one-quarter inch, and simultaneously cured. If necessary, prior to insertion of the tremolite-uncured resin panel into the press the press plates may be treated with a suitable release agent, such as a silicon release agent, for example. The pressure molded composite structural panel was allowed to cool to approximately 100° F. in the press before being removed therefrom. The panel was observed to have a hard glossy surface and much more highly resistant to chipping, particularly at the corners, such as is normally prevalent with asbestos-cementitious panels.

EXAMPLE II

The process of Example I was repeated utilizing a particle board core and a tremolite-resorcinol-formaldehyde resin admixture in the proportions set forth in Example I wherein about 9 parts tremolite were used to 1 part resin. The coated particle board core was subjected to compression molding in a heated press in the temperature and pressure ranges in the manner set forth in Example I. The composite structural panel so produced was found to be substantially equivalent to the panel produced by the process of Example I.

EXAMPLE III

The process of Example I was repeated utilizing an unfinished fiber board core and an admixture of approximately 9 parts, by weight, of tremolite and 1 part, by weight, of melamine-formaldehyde resin in place of the phenol-formaldehyde resin. The fiber board core, with a suitable thickness of the uncured resin thereon, was subjected to the action of a heated press heated to a temperature in the range of approximately 280° F. to 340° F. at a final pressure in the order of 1000 to 7000 p.s.i. to compress the coating to about one half its original thickness and cure the tremolite-resin coating. The tremolite-resin faced panel so produced was observed to have substantially the same desirable characteristics as the panels produced by the processes of Examples I and II.

Although not discussed hereinabove it will nevertheless be understood that composite structural panels produced in accordance with the present invention may be treated in the manner set forth in Examples I through III to pressure laminate a tremolite-thermosetting synthetic resin composition to both sides of a core member.

The foregoing is considered as illustrative of the principles of the invention. Aside from the criticality of the utilization of the tremolite-thermosetting synthetic resin compositions set forth numerous modifications and changes will readily occur to those skilled in the art and it is accordingly not desired to limit the invention other than by the scope of the invention as claimed.

What is claimed as new is as follows:

1. A method for the production of a composite structural panel which comprises the steps of: providing a preformed panel core selected from the group consisting of cardboard, particle board, plywood, heavy core cardboard and other unfinished fiber panels; applying to at least one surface of a panel core a composition consisting essentially, on the basis of weight, of about 9 parts fibrous tremolite and about 1 part uncured thermosetting synthetic resin selected from the group consisting of phenol-formaldehyde, resorcinol-formaldehyde, melamine-formaldehyde resins and admixtures of one another; pressure laminating the uncured coating to the panel core by subjecting the coated core to the action of a heated press at a temperature of about 260° to 350° F. at a final press pressure the said final press pressure being sufficient to effect, in conjunction with the heat applied, a thorough lamination of the composite structure and a significant compression of the thickness of the tremolite-uncured thermosetting synthetic resin non-compressed precursor, the maximum intensity of said final press pressure applied being chosen so as not to exceed the level where cell decomposition will take place in the particular core panel being used, for a sufficient period of time to cure and compress said tremolite resin during said heat and pressure laminating step to a thickness of not less than about one-half of the original thickness of the tremolite-uncured thermosetting resin non-compressed precursor; and allowing said pressure laminated structural panel to cool sufficiently to minimize internal strains before removing the panel from the press.

2. A composite structural panel comprising a generally fibrous core member having at least one major surface faced with a heat and pressure laminated coating of a composition consisting essentially, on the basis of weight, of about 9 parts fibrous tremolite and about 1 part thermosetting synthetic resin selected from the group consisting of phenol-formaldehyde, resorcinol-formaldehyde, melamine-formaldehyde resins and admixtures of one another, said panel being manufactured according to the process set forth in claim 1.

3. The composite structural panel of claim 2 wherein the pressure laminated coating of tremolite-thermosetting synthetic resin has a thickness of about one-half that of the thickness of the tremolite-uncured thermosetting synthetic resin non-compressed precursor.

4. The composite structural panel of claim 2, wherein the resin is phenol-formaldehyde.

5. The composite structural panel of claim 2, wherein the resin is resorcinol-formaldehyde.

6. The composite structural panel of claim 2, wherein the resin is melamine-formaldehyde.

References Cited

UNITED STATES PATENTS

| 2,034,522 | 3/1936 | Loetscher | 161—205X |
| 2,049,878 | 8/1936 | Stresino | 161—205 |
| 2,393,947 | 1/1946 | Ximenez | 161—205X |
| 2,451,410 | 10/1948 | Queeny | 161—205X |
| 2,486,235 | 10/1949 | Watt | 161—261X |
| 2,801,672 | 8/1957 | Baldwin et al. | 161—205X |
| 3,308,013 | 3/1967 | Bryant | 117—2X |

OTHER REFERENCES

Chemical Abstracts, Nov. 10, 1960, vol. 54, No. 21, pp. 22185, b & c, "Genetic Types of Formations of Amphotile Asbestos."

HAROLD ANSHER, Primary Examiner

D. J. FRITSCH, Assistant Examiner

U.S. Cl. X.R.

156—84, 311; 161—156, 160, 162, 170